J. C. LION.
THERMOSTATIC REGULATOR.
APPLICATION FILED MAR. 8, 1916.
1,212,234.
Patented Jan. 16, 1917.
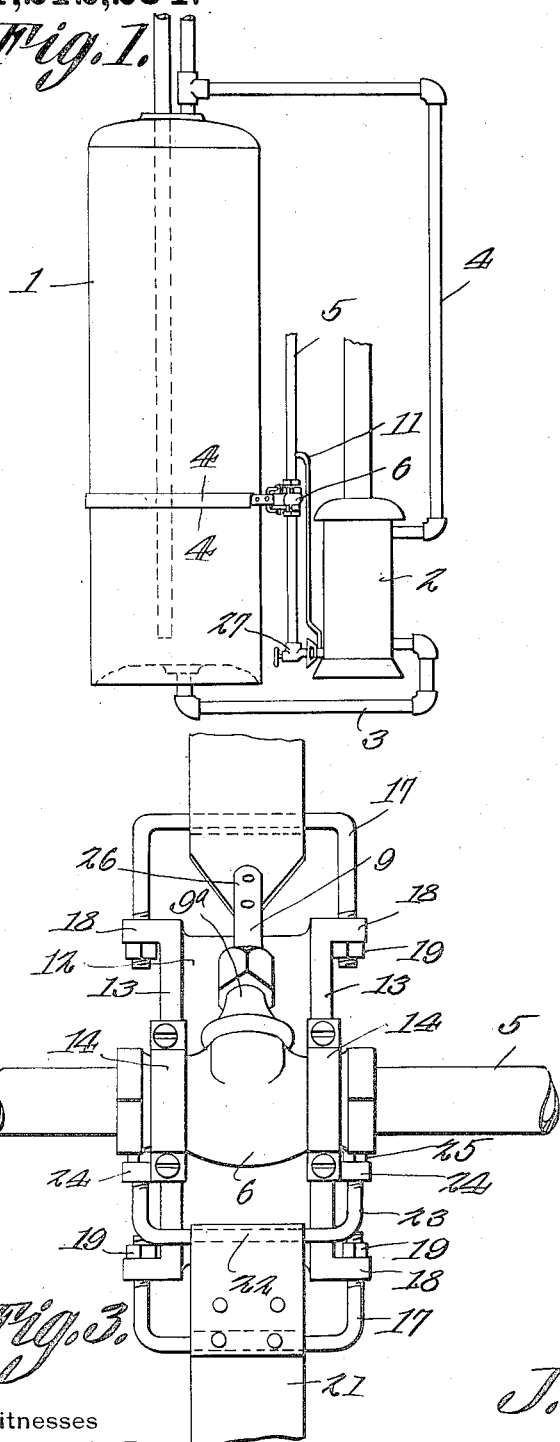
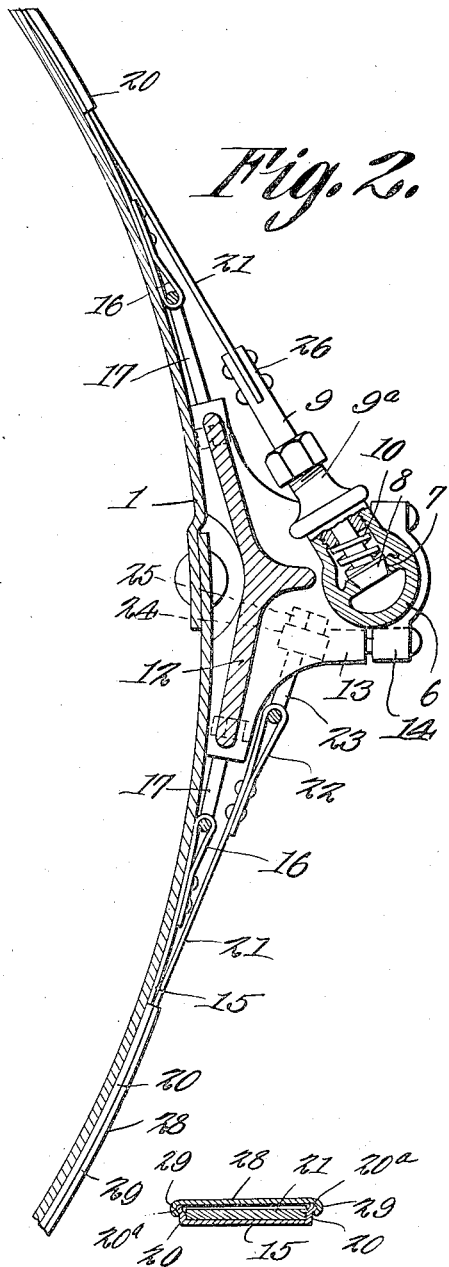
Witnesses
J. R. Tomlin
R. L. Parker.
J. C. Lion
Inventor,
by C. A. Snow & Co.,
Attorneys

UNITED STATES PATENT OFFICE.

JOHN CHARLES LION, OF ST. MARYS, PENNSYLVANIA.

THERMOSTATIC REGULATOR.

1,212,234.       Specification of Letters Patent.     Patented Jan. 16, 1917.

Application filed March 8, 1916. Serial No. 82,950.

*To all whom it may concern:*

Be it known that I, JOHN C. LION, a citizen of the United States, residing at St. Marys, in the county of Elk and State of Pennsylvania, have invented a new and useful Thermostatic Regulator, of which the following is a specification.

The present invention appertains to temperature control apparatus, and aims to provide a novel and improved device attachable to a hot water tank for controlling the supply of gas to the gas heater, although the invention can be used for divers purposes as a thermostatic regulator.

It is the object of the invention to provide a thermostatic regulator which provides for a constant gradual regulation of the temperature, and which will respond to even slight changes in temperature, the present device eliminating a sudden turning on and off of the gas as in an instantaneous water heater, and not requiring a relatively great rise and fall of temperature as is necessary to operate an "on and off" thermostat control. The present regulator is so constructed that the flow of gas or fluid is inversely proportional to the temperature resulting therefrom, and the valve will respond to all temperatures for controlling the flow of gas or fluid accordingly, and without a sudden decrease or acceleration in the flow of gas or fluid.

A further object of the invention is the provision of a regulator of comparatively simple construction and moderate cost, which can be easily attached to hot water tanks now in use, with but little pipe fitting and without entailing prohibitive trouble or expense.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of a hot water tank and its heater with the present regulator assembled therewith. Fig. 2 is an enlarged sectional detail of the regulator. Fig. 3 is an enlarged fragmental elevation of the regulator. Fig. 4 is an enlarged sectional detail on the line 4—4 of Fig. 1.

In the drawing, the regulator is illustrated as being applied to a hot water tank, such as is used for domestic purposes, but this is not to be taken as a limitation of the use of the regulator, since it can be employed for different purposes, as will be obvious to those versed in the art. There is depicted an upright hot water tank 1, the water of which is heated by a gas heater 2 connected to the lower end of the tank 1 by a pipe 3, and connected to the upper end of said tank by a hot water riser pipe 4, the heater 2 being supplied with gas by a gas supply pipe 5 which extends in a vertical direction adjacent one side of the tank 1, although this is not compulsory.

In carrying out the invention, there is interposed in the gas supply pipe 5, a globe casing 6 provided therein with a conical valve seat 7 in which is seatable a conical valve 8 to control the flow of gas, said valve 8 having a stem 9 which is slidable through the bonnet 9ª of the casing 6. The valve 8 is moved yieldably toward its seat under the influence of a coiled wire expansion spring 10 surrounding the stem 9 and confined between the valve 8 and bonnet 9ª. In adapting an ordinary hot water tank to the present invention, if an ordinary valve is interposed within the pipe 5, it is altered as above indicated, or is replaced, which can be readily done.

It is preferable to connect a pilot light tube 11 to the pipe 5 ahead of the valve casing 6, whereby the burner of the heater 2 can be provided with a pilot light in order to insure of the lighting of the gas at all times.

The valve casing 6 is attached to the tank 1 and its valve 8 is operated by the temperature of said tank, and to this end a yoke or casting 12 is provided, and is of such shape as to fit the side of the tank 1 adjacent the valve casing 6. This yoke 12 has a pair of outstanding brackets 13 to which are bolted or otherwise secured removable caps 14. The end portions of the casing 6 are clamped between the brackets 13 and their caps 14, and this permits the casing 6 to be adjusted to the proper angle. A band or hoop 15 embraces the tank 1 and has its ends bent back and riveted or otherwise secured to provide the loops 16 engaging the bends of a pair of U-bolts or stirrups 17, and the terminals of said bolts 17 pass through apertured ears 18 outstanding from the ends of the yoke 12 and have nuts 19 threaded thereon and seating against the ears 18. The nuts 19 can be tightened whereby the band 15 will tightly embrace the tank, to hold said band and yoke 12 in place. Said band and yoke can be readily applied to the tank 1 and are preferably located at a suitable point thereof near the lower end of the tank, or at such a point where it is desired to normally have the hot water reach, to assure of a desired amount of hot water in the tank under operating conditions. The edges of the band 15 have outstanding flanges 20 providing a channel in which is seated a ribbon or strap 21 of suitable metal or other material having a relatively high co-efficient of expansion, while the band 15 and tank 1 have a relatively low co-efficient of expansion. One end of the ribbon 21 is bent back and riveted or otherwise secured to provide a loop 22 engaging the bend of a U-bolt or stirrup 23, the limbs of which are slidable through apertured ears 24 outstanding from the brackets 13, nuts 25 being threaded upon the terminals of the bolt 23 and seating against the ears 24 to anchor the respective end of the ribbon 21 to the yoke 12. The other end of the ribbon is riveted or otherwise secured, as at 26, to the outer end of the valve stem 9.

The regulator is preferably used with a hand controlled valve 27 for the pipe 5 between the valve casing 6 and the heater 2.

The ribbon 21 is preferably inclosed within the channel-shaped band 15 by means of an arcuate cap 28 having side corrugations 29 adapted to snap into engagement with the outstanding beads 20ᵃ of the flanges 20, as seen in Fig. 4. Thus, the cap 28 covers the ribbon 21, except the terminals thereof, to prevent the undue exposure of the ribbon to dirt, moisture and other extraneous matter. The ribbon 21 is slidable longitudinally within the channel-shaped band 15.

In operation, the nuts 25 are tightened sufficiently to render the ribbon 21 taut, and whereby said ribbon holds the stem 9 against the tension of the spring 10, with the valve 8 unseated. The terminals of the bolt 23, or the nuts 25 can be calibrated to the temperatures at which the water in the tank at the level of the band will be maintained at these various positions of the terminals, whereby the device can be adjusted simply by adjusting the nuts 25. Ordinarily, considering the tank 1 to be cooled adjacent the band 15, the ribbon 21 in being cooled will contract, and since one end thereof is anchored to the yoke 12, the other end thereof will be drawn away from said yoke, thereby pulling the stem 9 to unseat the valve 8. The gas can therefore flow through the casing 6 to the heater 2 so that the water is heated, the hot water passing to the upper end of the tank 1. Then, as the hot water within the tank lowers to a point near the band 15, so that portion of the tank contiguous to the band 15 and ribbon 21 is heated, said ribbon 21 will naturally be heated and will expand gradually as the temperature rises. When the ribbon 21 expands, it permits the spring 10 to move the stem 9 inwardly with respect to the casing 6, thereby moving the valve 8 toward its seat, and shutting off the flow of gas correspondingly. The higher the temperature adjacent the ribbon 21, the more will said ribbon expand, and the further will the valve 8 be seated, so that the flow of gas is checked properly. If the temperature reaches an excessive or abnormal degree, the valve 8 will be completely seated, as seen in Fig. 2, thereby shutting off the flow of gas, and extinguishing the flame of the heater 2, and this condition will continue until the ribbon 21 is cooled gradually by the withdrawal of the hot water from the tank, or the cooling of the hot water, in which event the ribbon 21 in gradually cooling will gradually open the valve 8 to reëstablish the flow of gas. It is preferable to set the valve 27 for a maximum flow of gas, whereby an excessive flow of gas is avoided, and this acts as a safeguard to prevent overheating. There is no sudden fluctuation in the flow of gas, as in an instantaneous water heater, and it does not require a great rise or fall of the temperature for purpose of regulating the flow of gas, since the present regulator is sensitive to all changes in temperature, even though slight. The regulation of the flow of gas is constant and gradual.

The device can be used generally as a thermostatic regulator, and in this aspect of the invention, the tank 1 can be taken to represent any suitable column or object having a low co-efficient of expansion, to which the device is applied for operating any suitable valve 8 which controls the flow of gas, steam, hot water, or the like, whereby the temperature of the ribbon 21, which may be exposed to the air within a room, or the like, will control the position of the valve. The regulator can be used for maintaining the temperature at different degrees, according to how the device is set, and either a high or low temperature can be maintained.

Although the ribbon 21 in the device illustrated is under tension, a ribbon which has one end suitably secured to the yoke 12, can be used which in expanding will force the valve 8 toward its seat. In this case, a tunnel-shaped band is used, whereby the expansion of the ribbon will be diverted into a longitudinal movement of the free end thereof for operating the valve.

The band or ribbon need not necessarily be of circular form, since it can be of straight form, upon the side of a column or other object, serving as a frame, one end of the ribbon being anchored to the frame or column and the other end being secured to the valve which is carried by said frame or column.

By providing a valve with the seat reversed, so that the expansion of the ribbon will allow an increase in flow, the device can be used to regulate the cooling of a cold storage chamber, and the like, by controlling the flow of a cooling medium, or by controlling the fuel supply used in driving a cooling device. The valve need not necessarily be of the conical type, but may be of the gate, butter fly, or any other suitable type, so that the valve illustrated is to be taken as typical.

Having thus described the invention, what is claimed as new is:

1. A thermostatic regulator embodying a valve, means for supporting said valve including a band to embrace an object, and a ribbon extending around said band and having one end anchored in place and the other end connected to the valve, said ribbon having a high co-efficient of expansion.

2. A thermostatic regulator embodying a yoke, a band terminally connected to said yoke and adapted to embrace an object, a valve carried by said yoke, and a ribbon having one end anchored to said yoke and having its other end connected to said valve, the ribbon extending around said band and having a high co-efficient of expansion.

3. A thermostatic regulator embodying a yoke, a band to embrace an object in conjunction with said yoke, means adjustably connecting the ends of said band and yoke to tighten them upon the object, a valve casing carried by said yoke and having a valve therein, a ribbon extending around said band and having a high co-efficient of expansion, one end of said ribbon being connected to said valve, and means adjustably connecting the other end of said ribbon and yoke.

4. A thermostatic regulator embodying a yoke having a pair of outstanding brackets provided with caps, a valve casing clamped in place by said caps, a spring pressed valve within said casing having a stem projecting slidably out of said casing, a channel-shaped band to embrace an object in connection with said yoke and having loops at its ends, U-bolts engaging said loops and having their terminals adjustably connected with the ends of said yoke, a ribbon extending around said band and having a high co-efficient of expansion, one end of said ribbon being attached to the valve stem and the other end having a loop, and a U-bolt engaging the last mentioned loop and having its terminals adjustably connected with said brackets.

In testimony that I claim the foregoing as my own, I have hereto affixed my signature in the presence of two witnesses.

JOHN CHARLES LION.

Witnesses:
T. J. VALENTINE, Jr.,
J. L. MALLISON.